United States Patent [19]

Smith et al.

[11] Patent Number: 5,088,278
[45] Date of Patent: Feb. 18, 1992

[54] FUEL CONTROL SYSTEM FOR A GAS TURBINE ENGINE

[75] Inventors: Trevor S. Smith; John M. Binns, both of Sutton Coldfield; Graham F. Johnson, Solihull, all of Great Britain; Paul M. Maker, Pequannock, N.J.

[73] Assignee: Lucas Industries public limited company, Solihull, England

[21] Appl. No.: 631,097

[22] Filed: Dec. 19, 1990

[30] Foreign Application Priority Data

Jan. 4, 1990 [GB] United Kingdom ............... 9000176

[51] Int. Cl.⁵ .................................................. F02C 9/28
[52] U.S. Cl. .................................................. 60/39.281
[58] Field of Search ...................................... 60/39.281

[56] References Cited

U.S. PATENT DOCUMENTS

| | | | |
|---|---|---|---|
| 4,033,112 | 7/1977 | Schuster | 60/39.281 |
| 4,145,876 | 3/1979 | Stearns | 60/39.281 |
| 4,344,281 | 8/1982 | Schuster et al. | 60/39.281 |
| 4,760,662 | 8/1988 | Dyer et al. | 60/39.281 |
| 4,793,133 | 12/1988 | White et al. | 60/39.281 |

Primary Examiner—Louis J. Casaregola
Attorney, Agent, or Firm—Nixon & Vanderhye

[57] ABSTRACT

A gas turbine engine is supplied with fuel by way of a metering unit which includes a metering valve responsive to a servo pressure which is regulated by electrical signals from a control circuit. Failure of electrical signals to the metering unit results in the metering valve being arrested in its position at failure. A combined manually operable and shut-off valve arrangement is in series with the metering unit includes a valve which is normally biassed fully open and is operable by a manually regulated servo pressure. The manually operable arrangement also includes a device for setting the servo pressure of the valve in the metering unit to a value which maintains that metering valve fully open.

8 Claims, 10 Drawing Sheets

FUEL CONTROL SYSTEM FOR A GAS TURBINE ENGINE

Where a fuel control system for a gas turbine engine is controlled by electrical signals it is known to provide that in the event of electrical malfunction the system can be reverted to manual control. Where provision is made for such manual reversion may be desirable that reversion shall not be initiated automatically by detection of an electrical malfunction, since the possibility exists of a spurious transient signal initiating the reversion. If the manual reversion is to be delayed the fuel supply must be maintained substantially at a level which existed at the time of failure, until reversion has been completed.

It is an object of the invention to provide a fuel control system in which the above requirements are met.

In one of its embodiments the invention relates to a fuel control for a helicopter gas turbine engine, in which fuel flow is required to be variable in response to a power selection signal and to a collective pitch control. It is known, for example from EP-A-082785, to control fuel for a helicopter engine by means of a single valve which is responsive both to power demand and collective pitch. In such a system it will be necessary in the event of manual reversion that fuel flow shall continue to be responsive to the collective pitch control.

The invention provides that fuel flow during manual reversion is provided by one or more separate valves which during normal operation do not affect fuel flow, and further that the valves used during normal operation do not affect fuel flow when the system is in manual control.

According to the invention there is provided a fuel control system for a gas turbine engine, comprising a first metering device responsive to a first servo pressure in a chamber of said device, a first, electrically operable regulating valve for controlling said first servo pressure, a second metering device responsive to a power demand for the engine, means for selecting fuel flow regulation by said first or said second metering device, an interrupt valve operable in response to absence of an electrical control signal to said regulating valve, for creating a hydraulic lock in said chamber, thereby to arrest operation of said first device, and means operable when fuel control by said second metering device has been established, for moving said first metering device to a fully open condition.

Embodiments of the invention will now be described by way of example only and with reference to the accompanying drawings in which.

The drawings are intended to be read in conjunction and corresponding elements in the drawings have identical reference numerals.

Figure 1:
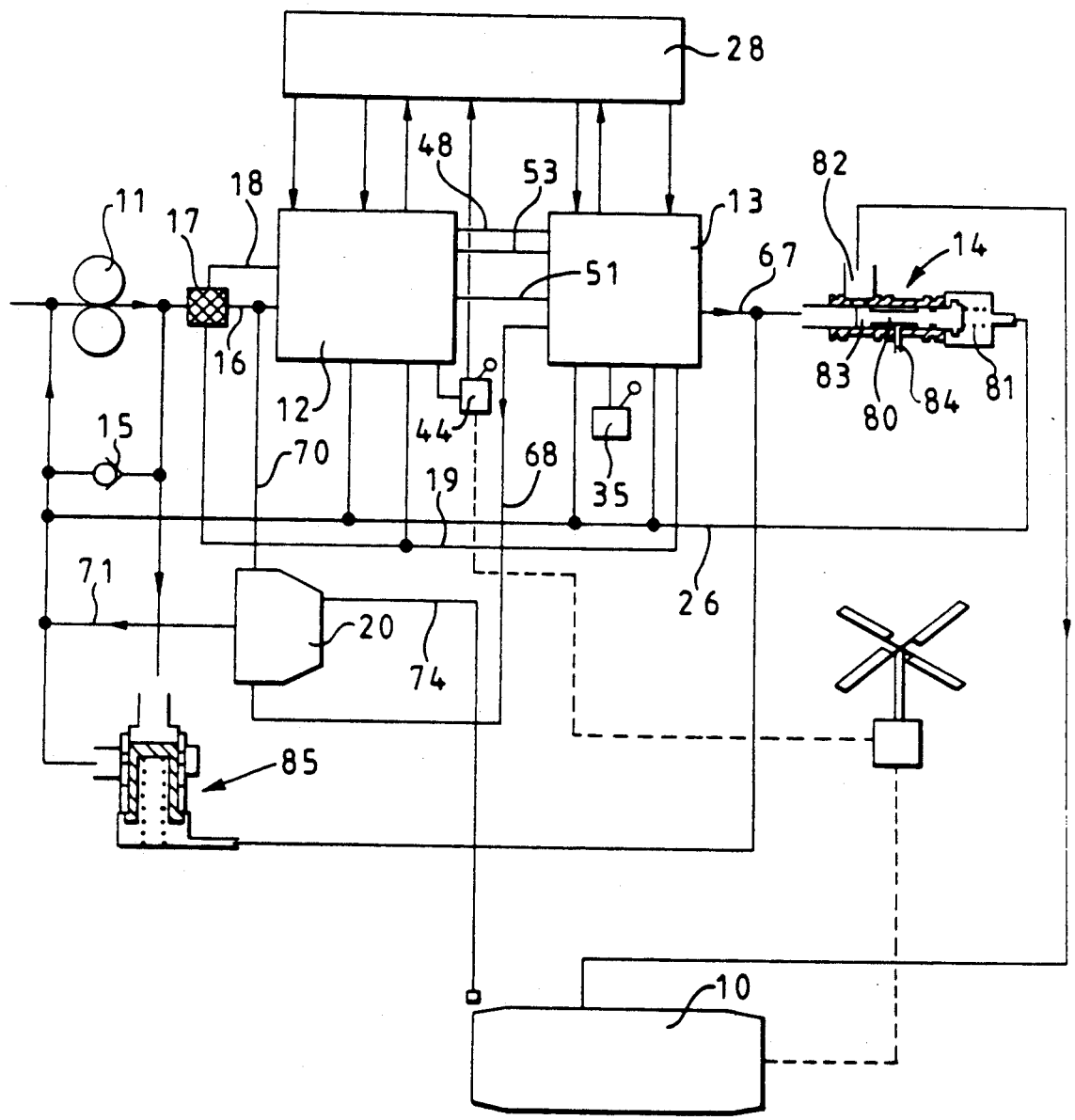
FIG. 1 is a block diagram of a fuel control system.

As shown in FIG. 1 fuel is supplied to an engine 10 from a pump 11 by way of a fuel metering unit 12, a manual metering and shut-off valve arrangement 13 and a combined pressurising and dump valve 14. A pressure relief valve 15 is connected between the outlet passage 16 and the inlet of the pump 11. A filter 17 allows clean fuel to be supplied from the outlet passage 16 to lines 18, 19. A pressure drop control unit 20 is responsive to a difference between the pressure in passage 16 and that at the outlet of the valve arrangement 13, to spill fuel from the passage 16 to a low pressure zone upstream of the pump 11.

Figure 2:
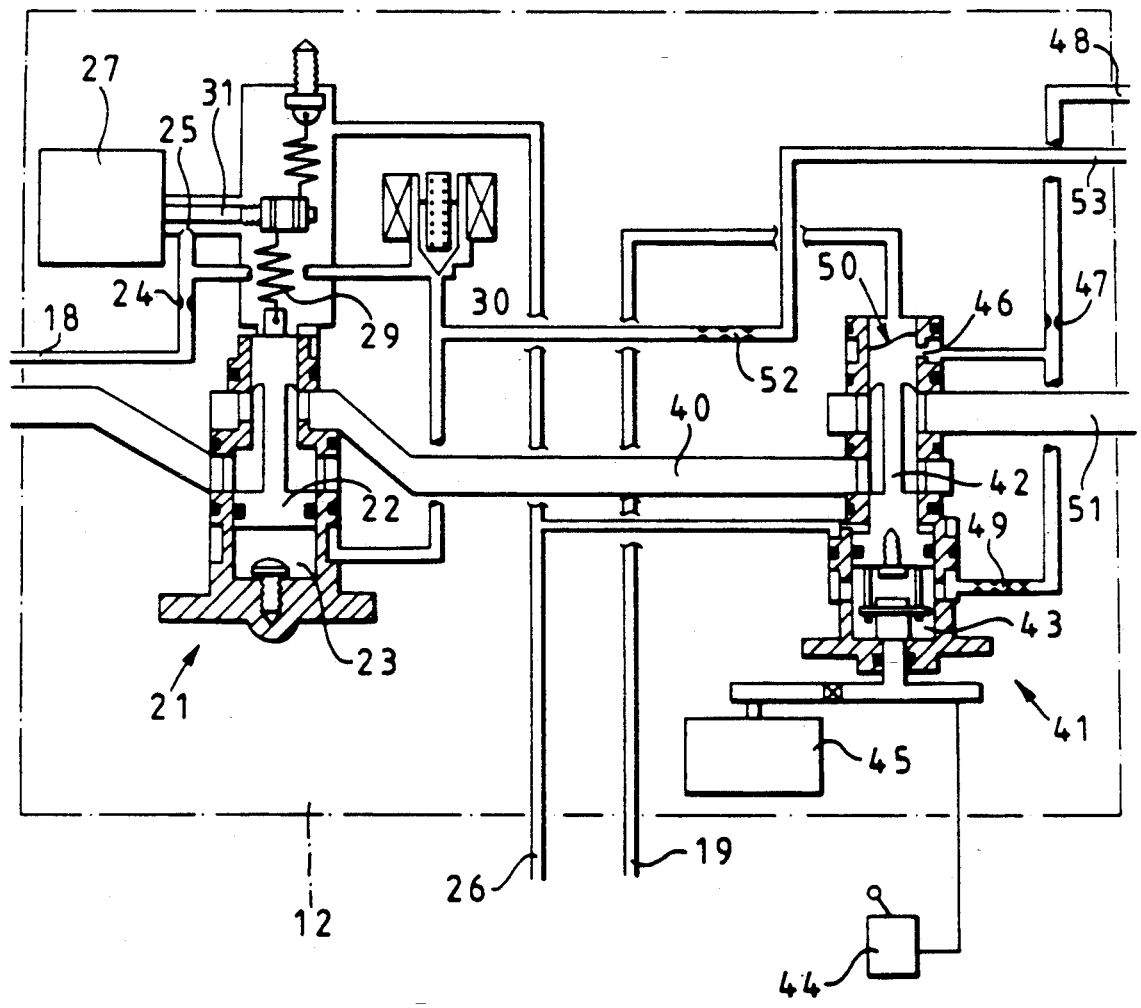
FIG. 2 is a diagram of a fuel metering unit forming part of FIG. 1.

The metering unit 12 shown in FIG. 2 comprises a main metering valve 21 whose control element 22 is responsive to a servo pressure in a chamber 23, this pressure being that between a fixed restrictor 24 and a variable restrictor 25 which are in series between the line 18 and a low pressure line 26. Flow through the restrictor 25 is controlled by an element 31 movable by a torque motor 27 responsive to a current signal from a control circuit 28 (FIG. 1). The element 31 is connected to the element 22 by a spring 29 such that movement of the element 22 in response to a change in pressure in chamber 23 urges the element 31 in a direction to oppose that pressure change. A solenoid valve 30 is energised open against a biasing spring by a signal from the circuit 28 when that circuit, and hence the current signal to the torque motor 27, is operating normally. In the absence of this signal the solenoid valve 30 shuts, placing a hydraulic lock in the chamber 23 and maintaining the element 22 in the position at which failure occurred.

The outlet of the valve 21 is connected through a passage 40 to a collective pitch metering valve 41 which has a control element axially slidable in response to servo pressure in a chamber 43. The control element 42 is also rotatable by a manual control 44 for the collective pitch of the aircraft rotor vanes. The position of the control 44 is transmitted to the circuit 28 by a pick-up device 45. The pressure in the chamber 43 is that intermediate a variable restrictor 46 and a fixed restrictor 47 connected in series between the line 19 and a line 48 which is in turn selectively connectable to the line 19 or to the low pressure return line 26. The pressure between the restrictors 46, 47 is applied to the chamber 43 by way of rate limiting restrictors 49. The flow area of the orifice 46 is controlled by a cam face 50 at one end of the control element 42, such that flow through the orifice 46 is dependent on both the axial and angular positions of the element 42. The arrangement is such that angular movement of the element 42 produces a change in the pressure in chamber 43 urging the element 42 in a direction to oppose that pressure change. It will noted that the area of the cam face 50 is less than the area of the control element 42 exposed to the pressure in chamber 43. The element 42 may thus adopt an equilibrium position when the orifice 46 is open, even though high pressure is applied to the face 50.

The outlet of the valve 41 communicates through a passage 51 with the valve arrangement 13 (FIG. 1). The chamber 23 also communicates by way of flow restrictors 52 and a line 53 with the valve arrangement 13.

The valve arrangement 13 comprises a manually operable combined metering and shut-off valve 54 with which the passage 51 communicates. A control element 55 of the valve 54 operates in a manner generally similar to that of the control 42 of the valve 41, and is responsive to the pressure in a chamber 56. The control element 55 has an abutment 57 which can urge a valve plate 58 against a spring 59 to close off a restricted outlet 60 at the end of the line 53. The pressure in chamber 56 is that intermediate a fixed restrictor 61 and a variable restrictor 62, flow through the restrictor 62 being dependent on the operating position of a cam face 63 on the control element 55. The pressure between restrictors 61, 62 is applied to the chamber 56 by way of rate limiting restrictors 64. The restrictors 62, 61 are arranged in series between the line 19 and a line 65, to which the line 48 is connected. A solenoid operated change-over valve 66 is selectively operable by signals from the circuit 28 to connect the line 65 to the high pressure line 19 or to the low pressure return line 26. An outlet passage 67 from the valve 54 communicates with the pressurising and dump valve 14. A position sensor 69 signals the operating position of the control element 55 to the circuit 28. The passage 67 communicates through a line 68 with the pressure drop control unit 20.

Figure 4:
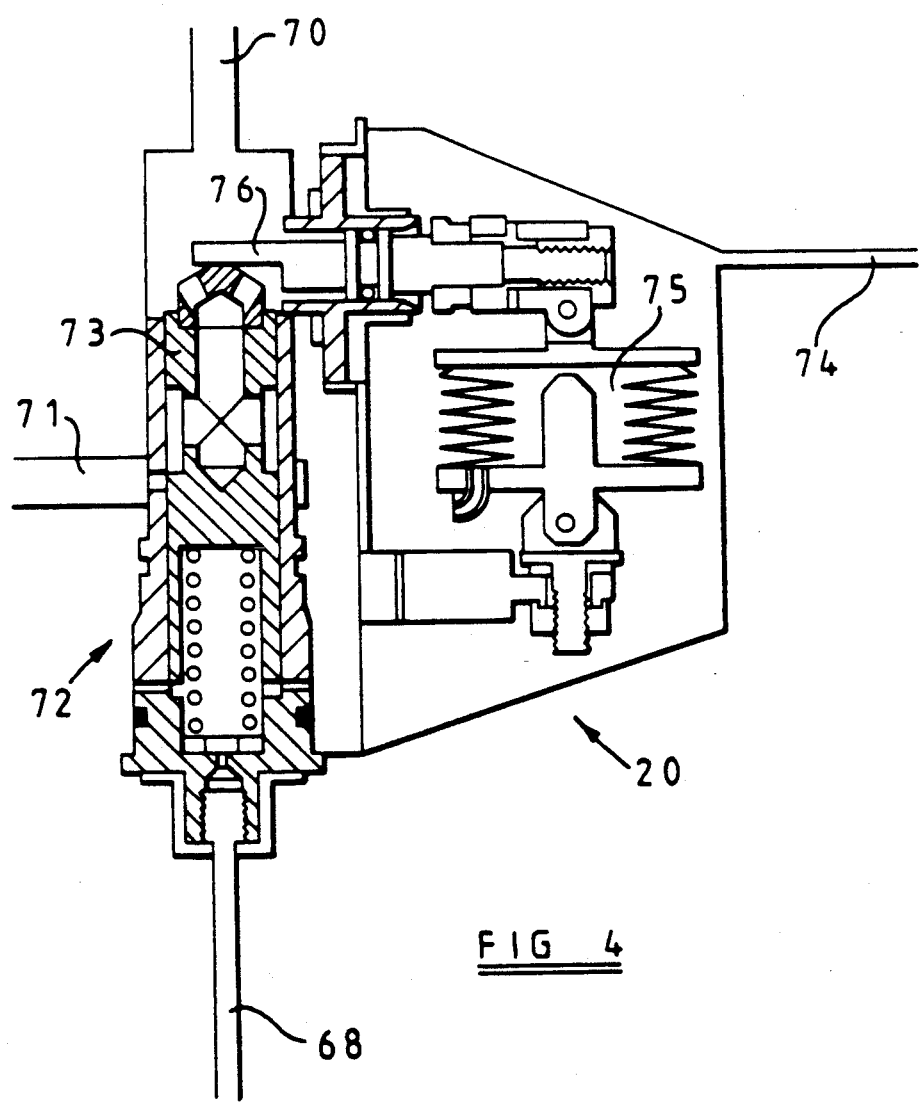
FIG. 4 is a diagram of a pressure drop control unit forming part of FIG. 1.

As shown in FIG. 4 the unit 20 has an inlet passage 70 communicating with the passage 16 and an outlet passage 71 communicating with a zone upstream of the pump 11. A spill valve 72 has a control element 73 which is spring loaded in a direction to reduce flow between the passages 70, 71 and which is urged in the same direction by the pressure in line 68. The control element 73 is urged to increase spill flow by the pressure in passage 70 and the valve 72 will thus increase spill flow in response to an increase in metered pressure difference across the series arrangement of the valves 21, 41, 54. The control element 73 is also responsive to engine inlet pressure P1 which is applied through a line 74 and acts on a evacuated bellows unit 75 which is coupled to an arm 76 which passes sealingly and pivotally through a wall of the unit 20 and engages an end of the control element 73.

The valve 14 (FIG. 1) has a spool control element 80 which is movable against a spring 81 to uncover an outlet port 82 through which fuel can flow to the engine 10. The bias of the spring 81 ensures that fuel does not flow to the engine 10 until its pressure within the system has risen to a level sufficient to enable the various servo controls to operate. The control element 81 includes a land 83 such that in the absence of a pressure in the passage 67 the outlet port 82 communicates with a dump outlet 84. An emergency spill valve 85 is connected in parallel with the pressure relief valve 15 and the pressure drop control 20 and is responsive to the pressures in passages 16, 67. The arrangement is such that if the pressure in the passage 67 falls to a low level, for example as a result of an escape of fuel from the engine 10, the spill valve 85 opens to interconnect the upstream and downstream sides of the pump 11.

Figure 3:
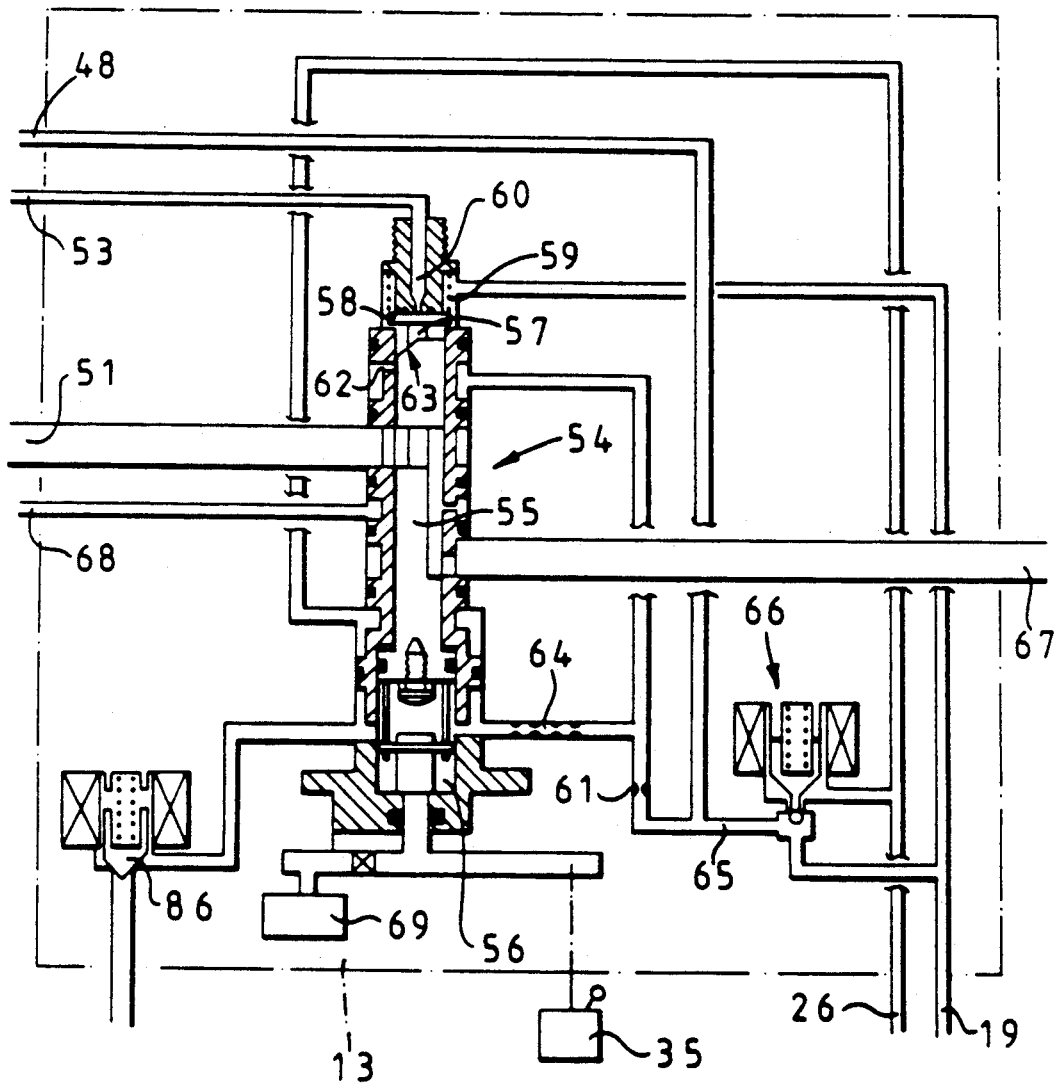
FIG. 3 is a diagram of a manual metering and shut-off valve arrangement forming part of FIG. 1.

In normal use the control circuit 28 is responsive to both desired and sensed operating conditions of the engine 10 and to the operating position of the collective pitch control to cause the valve 21 (FIG. 2) to regulate fuel flow to the engine 10 in accordance with these values. In normal operation the solenoid valve 66 (FIG. 3) is energised and high pressure from the line 19 is applied to both ends of the control element 42 of the valve 41 (FIG. 2) and the control element 55 of the valve 54 (FIG. 3). The valves 41 and 54 are thus maintained wide open. In the event of an overspeed condition of the engine 10 the control circuit 28 provides a signal to open a solenoid valve 86 (FIG. 3) reducing the servo pressure in chamber 56 to a low level and causing the valve 54 to shut.

In the event of a malfunction of the circuit 28 or the valve 21, or of the electrical supplies thereto, the valve 30 (FIG. 2) is de-energised, resulting in a hydraulic lock in the chamber 23 and causing the control element 22 to be maintained in its last-operated position. Simultaneously the valve 66 (FIG. 3) is de-energised, connecting the line 65 to the low pressure return line 26. The pressure in chamber 56 bleeds away through the rate limiting restrictors 64 and the control element 55 moves away from its fully open position. The plate valve 58 opens, connecting the high pressure line 19 to the chamber 23 (FIG. 2) through the restrictors 52 and the valve 21 moves to a fully open position at a rate determined by the restrictors 52.

Once the port of the flow restrictor 62 in the valve 54 (FIG. 3) has opened the pressure in chamber 56 becomes dependent on a combination of the axial and angular positions of the element 55. The axial position of the element 55 is thereafter determined by its angular position, as set by the power demand lever 35.

Operation of the solenoid valve 66 also connects the line 48 to the low pressure return line 26, so that the pressure in chamber 43 (FIG. 2) is dependent on the position of the collective pitch control 44. Fuel flow to the engine 10 is thereafter dependent on flow through the series arrangement of valves 41 and 54.

It will be apparent that if the malfunction is subsequently corrected the solenoid valves 30, 66 will be re-energised and the system will revert to normal operation.

Figure 5:
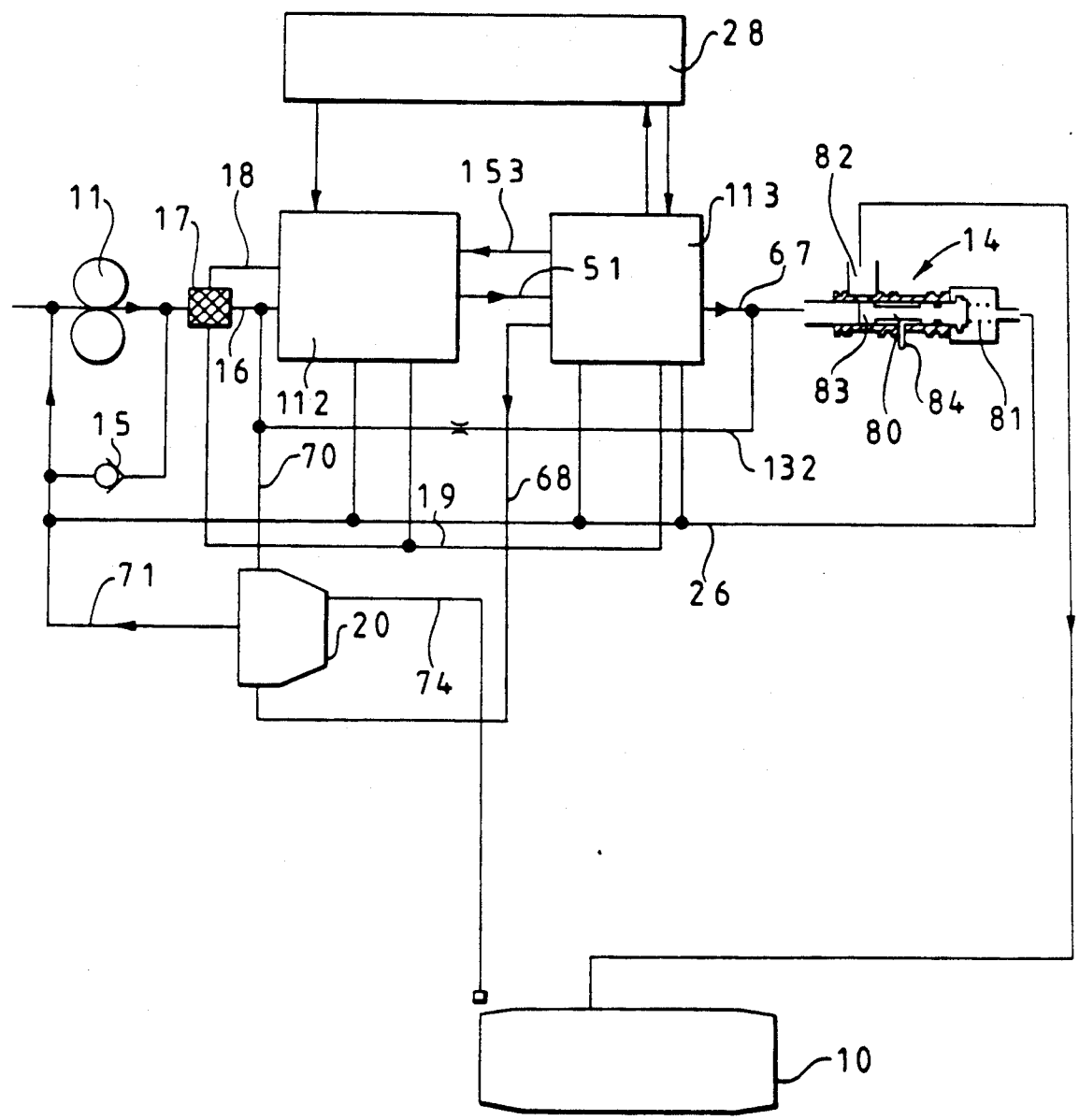
FIG. 5 is a block diagram of an alternative embodiment of the invention.
Figure 6:
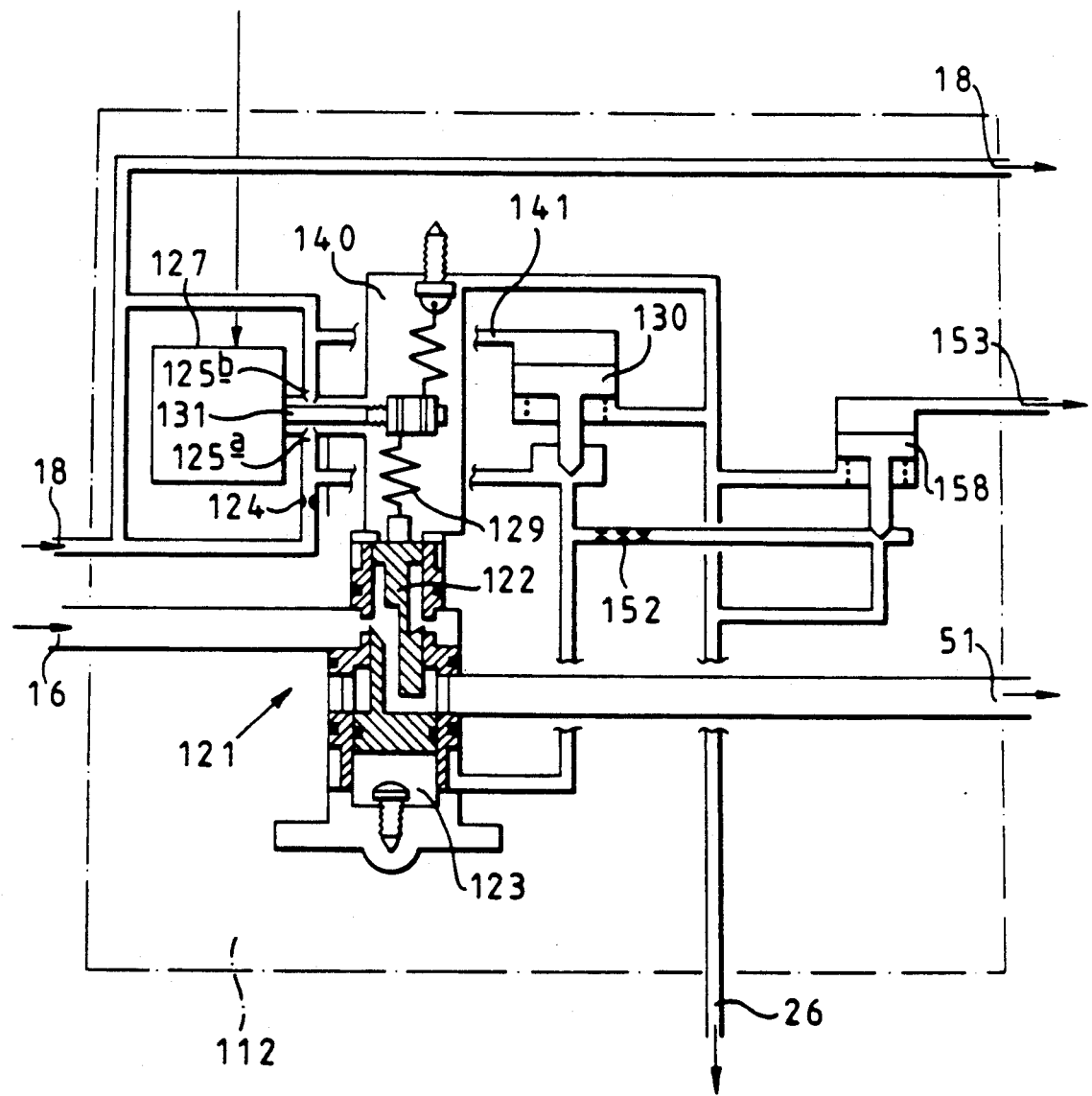
FIG. 6 is a diagram of a fuel metering unit forming part of FIG. 6.
Figure 7:
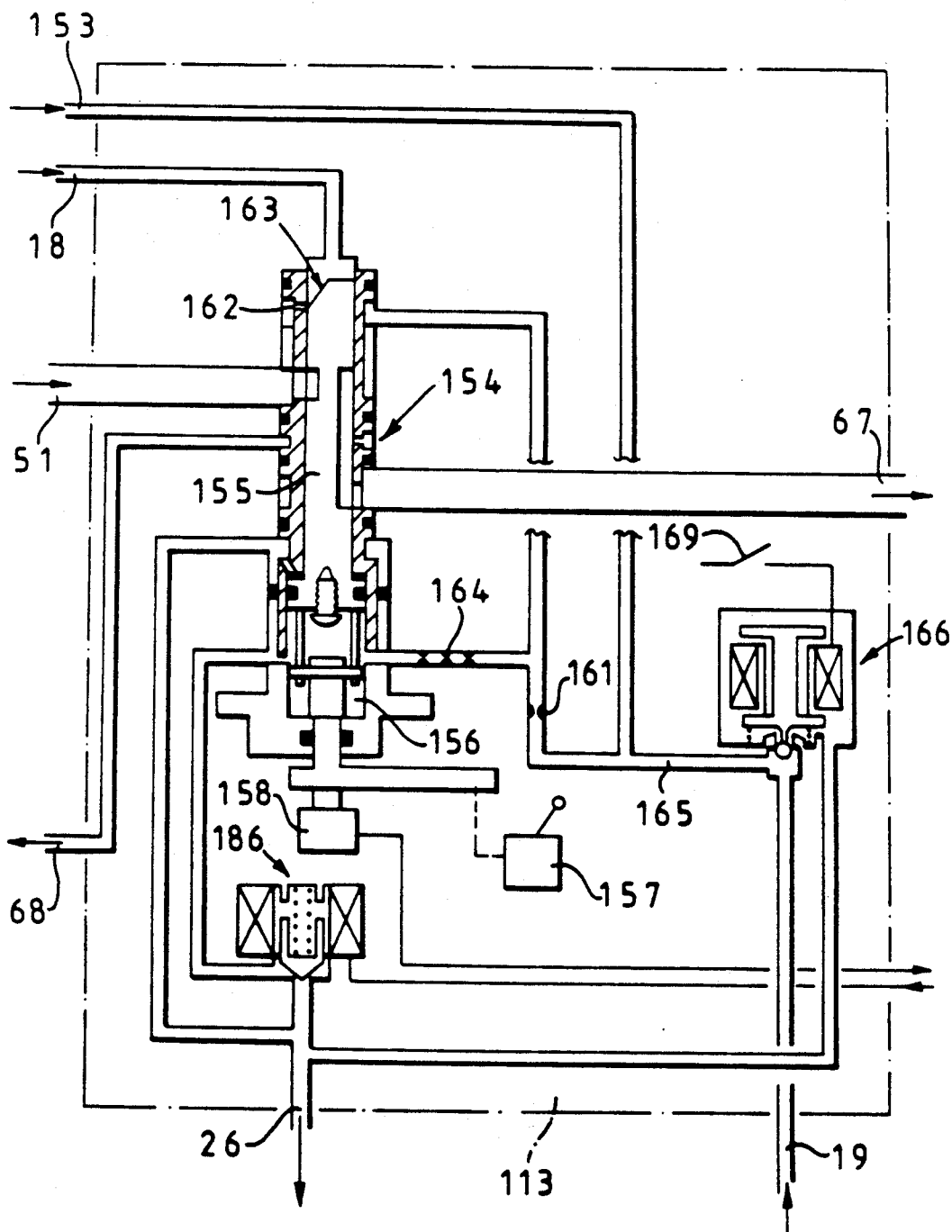
FIG. 7 is a diagram of a manual metering a shut-off valve arrangement forming part of FIG. 5.

The arrangement shown in FIGS. 5, 6 and 7 corresponds generally to that of FIGS. 1 to 4, and parts corresponding to those of FIG. 1 have been allocated identical reference numbers. The embodiment shown in FIG. 5 does not include the emergency spill valve 85 shown in FIG. 1. Moreover, the system of FIG. 5 is not for a helicopter engine and does not therefore include a collective pitch control. The system of FIG. 5 has a fuel metering unit 112 and a manual metering and shut-off arrangement 113, whose details differ from those of the unit 12 and arrangement 13 of FIG. 1, previously described. A restricted minimum fuel flow bypass line 132 is provided between the pump outlet passage 16 and the passage 67 to the pressurising and dump valve 14.

As shown in FIG. 6 the unit 112 comprises a metering valve 121 whose control element 122 is responsive to a servo pressure in a chamber 123, this pressure being that between a fixed restrictor 124 and a variable restrictor which is one of two aligned, opposed orifices 125a, 125b. The restrictors 124, 125a are in series between the filtered high pressure line 18 and a chamber 140 which communicates with the low pressure return line 26. The pressure in line 18 is independently applied to orifice 125b. Flow through the orifices 125a, 125b is controlled by an element 131 movable by a torque motor 127. The torque motor 127 is biassed to urge the element 131 to shut the orifice 125b, and is responsive to a current signal from the control circuit 28 (FIG. 5) to control flow through the orifice 125a. The element 131 is connected to the control element 122 by a spring 129 such that movement of the element 122 in response to a change in pressure in chamber 123 urges the element 131 in a direction to oppose that pressure change. The outlet of the valve 121 communicates through the passage 51 with the valve arrangement 113 (FIG. 5).

A valve plunger 130 can be urged against a biassing spring by the pressure in a line 141 which communicates with the high pressure line 18 and the orifice 125b. The plunger 130 is operable by the pressure in line 141 to shut off connection between the chamber 123 and the junction between the restrictor 124 and the orifice 125a, thereby creating a hydraulic lock in the chamber 123 and arresting movement of the control element 122.

A further valve plunger 158 is biassed open by a spring and by the pressure in line 26 and is normally urged against this bias by a pressure in a line 153, to isolate the pressure in the chamber 123 from the line 26. The pressure in line 153 is derived, in a manner to be described, from the arrangement 113 (FIG. 5).

As shown in FIG. 7 the valve arrangement 113 comprises a metering and shut-off valve 154 with which the passage 51 communicates. A control element 155 of the valve 154 is axially slidable in response to a servo pressure in a chamber 156, and is rotatable by a manually operable power demand lever 157. A position sensor 158 signals the operating position of the control element 155 to the circuit 28. The pressure in the chamber 156 is that between a fixed restrictor 161 and a variable restrictor 162, flow through the restrictor 162 being dependent on the rotational and axial position of a cam face 163 on the control element 155. The pressure between the restrictors 161, 162 is applied to the chamber 156 by way of rate limiting restrictors 164. The restrictors 162, 161 are arranged in series between the high pressure line 18 and a line 165. A solenoid operated change-over valve 166 is operable to connect the line 165 either to the high pressure line 19 or to the low pressure return line 26. The solenoid valve 166 is energisable by current from an electrical supply which is independent of the circuit 28 and is controlled by a manually operated switch 169. An outlet passage 67 from the valve 154 communicates with the pressurising and dump valve 14, previously described with reference to FIG. 1. The passage 67 also communicates by way of the line 68 with the pressure drop control unit 20, previously described with reference to FIG. 4. The servo pressure in chamber 156 may be reduced to that in the low pressure line 26 by a solenoid valve 186 which is energisable from the circuit 28.

In normal use the control circuit 28 is responsive to both desired and sensed operating conditions of the engine 10, to cause the valve 121 (FIG. 6) to regulate fuel flow in accordance with those values. The solenoid valve 166 is de-energised and high pressure from the line 19 is thus applied to the chamber 156 of valve 154, urging the latter fully open and shutting the restrictor 162. High pressure is also applied through the valve 166 to the line 153 and maintains the valve plunger 158 shut. In the event of an overspeed condition of the engine 10 the circuit 28 provides a signal to open the solenoid valve 186 (FIG. 7), reducing the servo pressure in chamber 156 and shutting the valve 154.

In the event of a malfunction of the circuit 28 the current supply to the torque motor 127 (FIG. 6) is shut off, and the torque motor 127 moves under the influence of its bias to shut the orifice 125b. The resulting high pressure in line 141 shuts the valve 130, creating a hydraulic lock in chamber 123 and arresting movement of the member 122. If an operator of the engine, for example the pilot of an aircraft decides to revert to manual control, the switch 169 (FIG. 7) is operated to provide low pressure on lines 153 and 165. The valve 158 opens, venting the chamber 123 to low pressure through rate restrictors 152. The valve 121 moves towards its fully open position and the valve 154 towards its fully shut position. Once the port of the flow restrictor 162 of the valve 154 is uncovered the pressure in chamber 156 is dependent on the axial and angular positions of the element 155, and flow through the valve 154 is controlled by the manual power demand lever 157.

Figure 8:
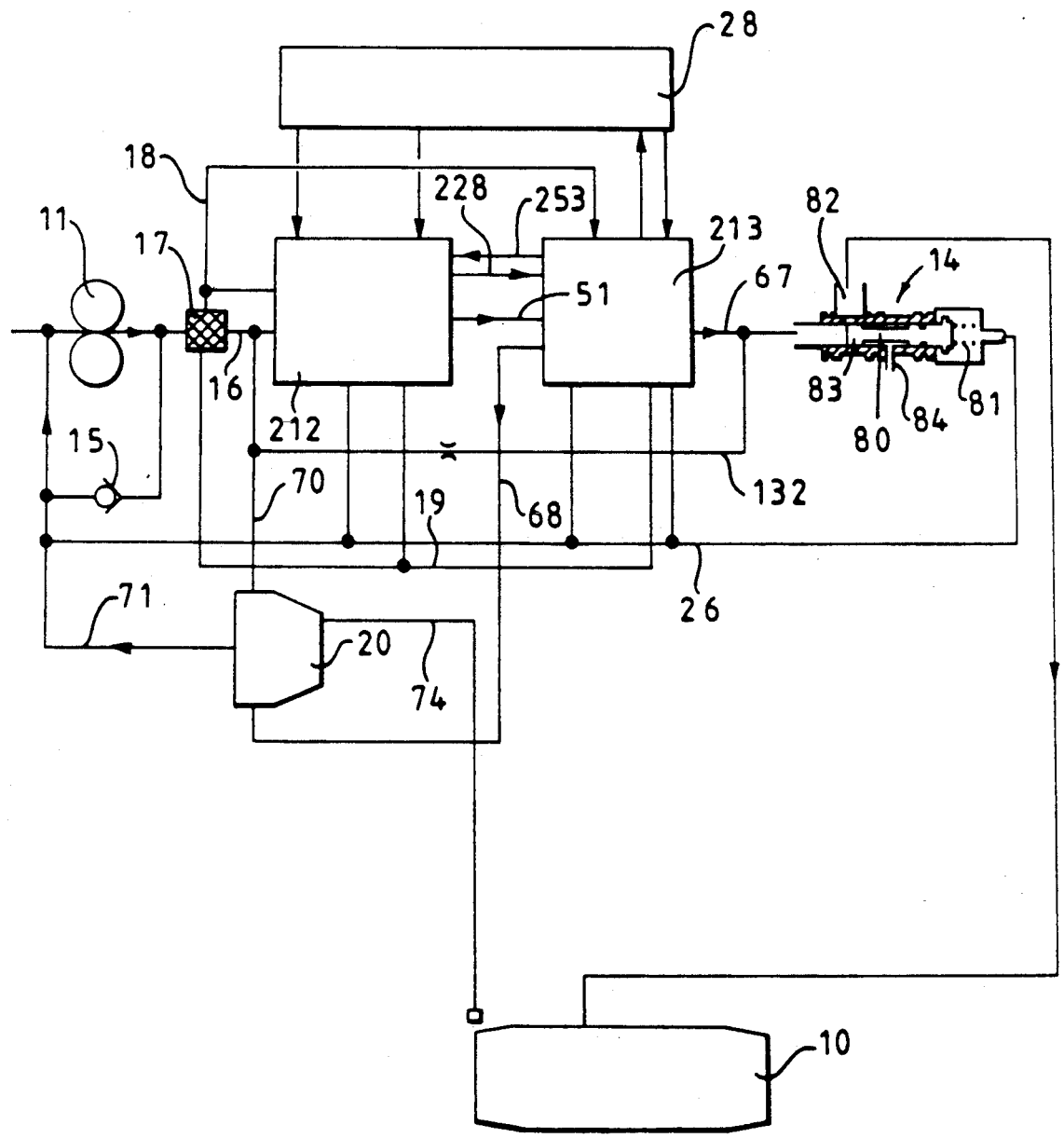
FIG. 8 is a block diagram of a modified version of FIG. 5.
Figure 9:
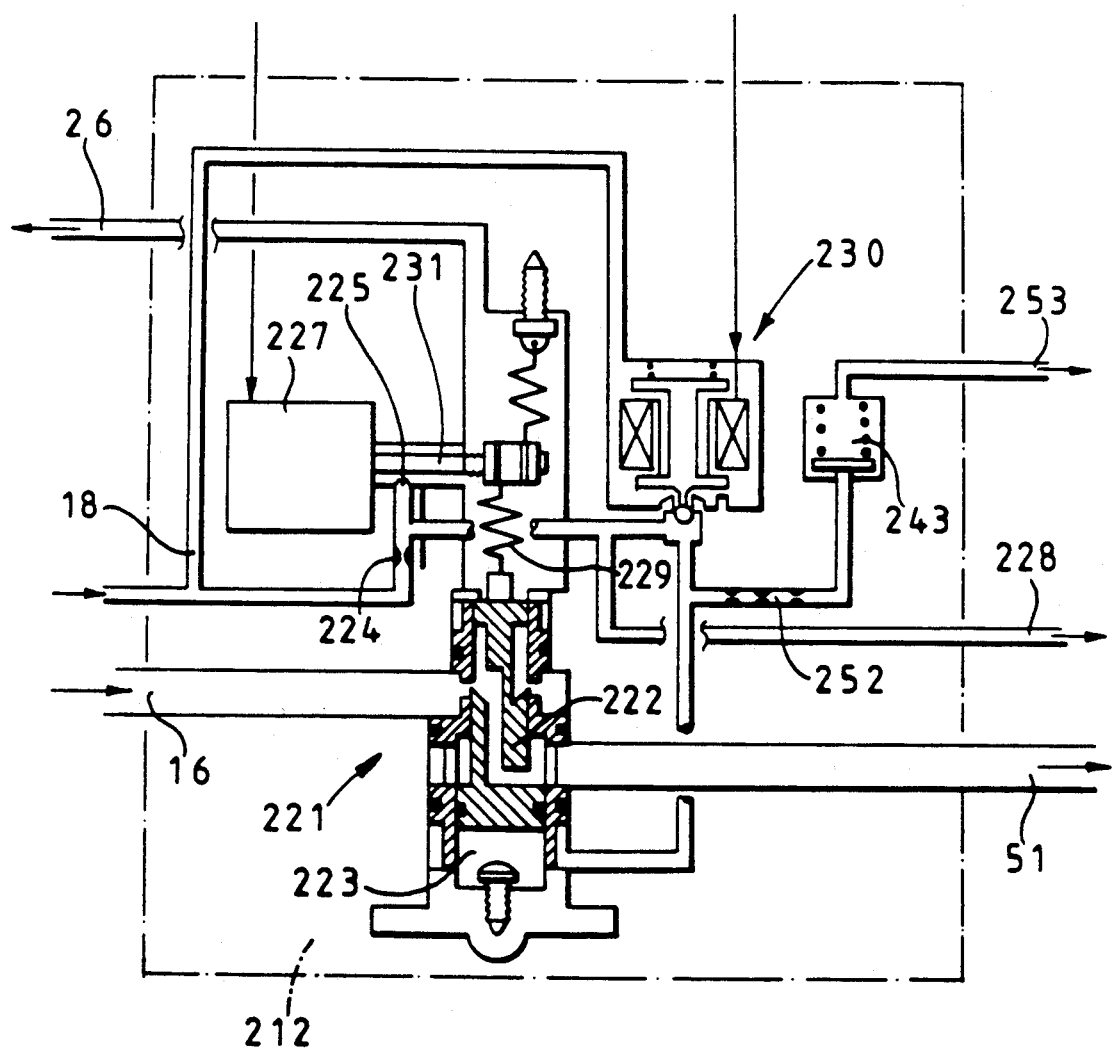
FIG. 9 is a diagram of a fuel metering unit forming part of FIG. 8.
Figure 10:
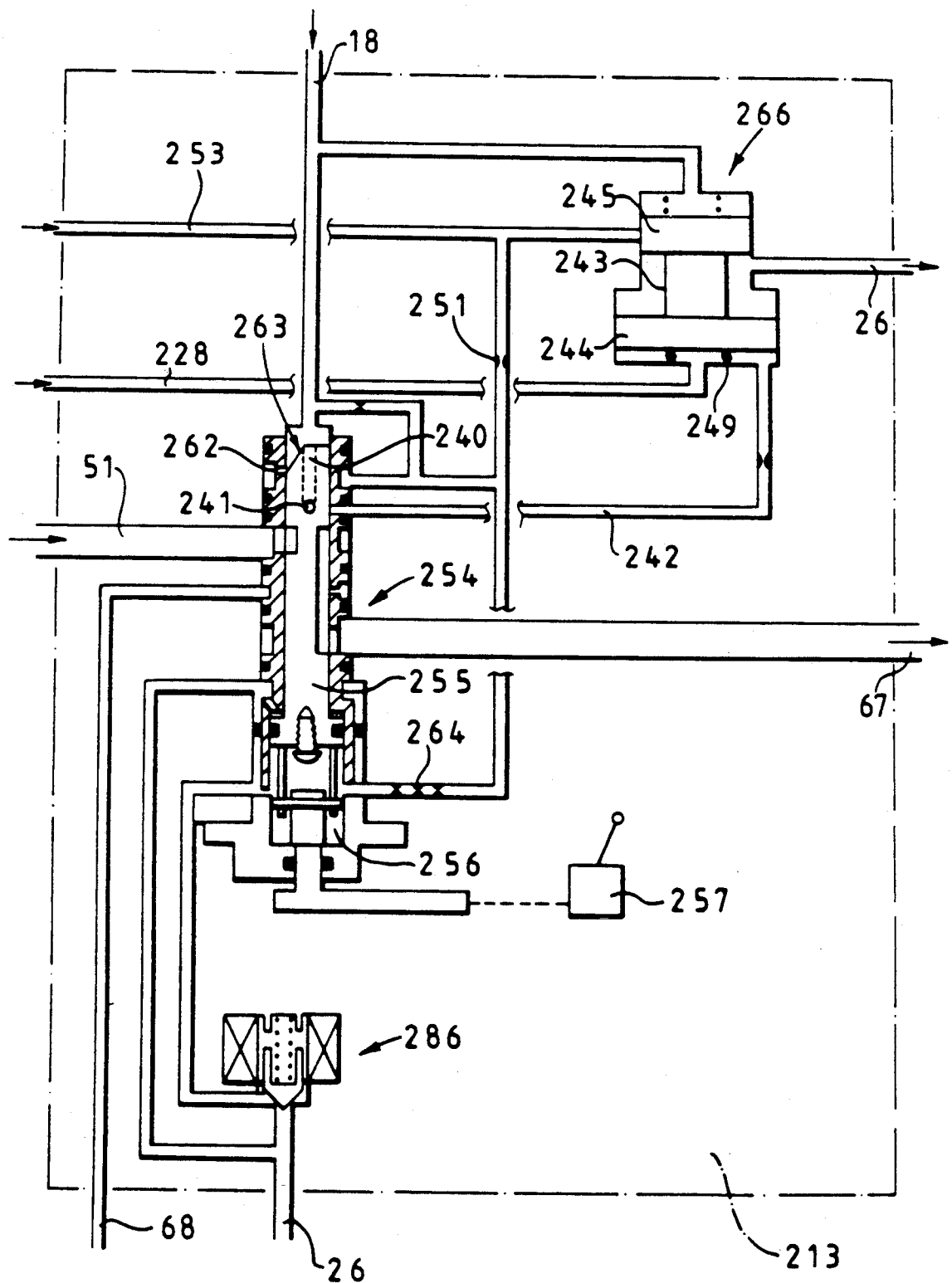
FIG. 10 is a diagram of a manual metering and shut-off valve forming part of FIG. 8.

The arrangement shown in FIGS. 8, 9 and 10 is a modification of that described above with reference to FIGS. 6, 7 and 8, and is intended to make possible a reversion to manual control in event of total electrical failure.

FIG. 8 shows a system which is generally similar to that of FIGS. 6, and parts corresponding to those of FIG. 6 have been given identical reference numbers. The system of FIG. 8 includes a fuel metering unit 212 and a manual metering and shut-off arrangement 213, shown in detail in FIGS. 9 and 10 respectively.

As shown in FIG. 9 the unit 212 comprises a metering valve 221 whose control element 222 is responsive to a servo pressure in a chamber 223, this pressure being that between a fixed restrictor 224 and a variable restrictor 225 which are in series between the high and low pressure lines 18, 26. Flow through the restrictor 225 is controlled by an element 231 movable by a torque motor 227 which is responsive to a current signal from the circuit 28. The element 231 is connected to the element 222 by a spring 229 such that movement of the element 222 in response to a change in pressure in chamber 223 urges the element 231 in a direction to oppose that pressure change. The outlet of the valve 221 is connected through the passage 51 with the arrangement 213.

A solenoid operated interrupt valve 230 is energised open against a biassing spring by a signal from the circuit 28, when that circuit, and the power supplies thereto, are operating normally. In the absence of that signal the solenoid valve 230 shuts, creating a hydraulic lock in the chamber 223 and maintaining the element 222 in the position at which failure occurred. The chamber 223 communicates by way of a group of rate-limiting flow restrictors 252 and a non-return valve 243 with a line 253, such that fuel cannot flow to the chamber 223 from the line 253. The junction between the restrictors 224 and 225 communicates by way of a line 228 with the arrangement 213.

As shown in FIG. 10 the valve arrangement 213 includes a metering and shut-off valve 254 with which the passage 51 communicates. A control element 255 of the valve 254 is axially slidable in response to the servo pressure in a chamber 256, and is rotatable by a manually operable power demand lever 257. The operating position of the control element 255 is signalled to the circuit 28 as described above with reference to FIG. 7. The pressure in chamber 256 is that between a variable restrictor 262 and a fixed restrictor 251 which are connected in series between the high pressure line 18 and the line 253 from unit 212. The line 18 also communicates by way of a fixed restrictor with the junction between the restrictors 251, 262. The flow area of the restrictor 262 is dependent on the axial and rotational operating positions of a cam face 263 on the control element 255. The servo pressure between the restrictors 251, 262 is applied to the chamber 256 by way of a series of rate limiting flow restrictors 264. At its end adjacent the cam face 263 the element 255 has an axial bore 240 which communicates with a radial bore 241. In one rotational position of the element 255 the radial bore 241 applies the high pressure in line 18 to a line 242.

A spool valve 266 is operable either to connect the line 253 to the low pressure return line 26, or to shut off that connection. The valve 266 has a stepped spool 243 to whose larger end 244 the pressures in lines 242 and 228 are applied, and to whose smaller end 245 the high pressure in line 18 is applied. The spool 243 is urged by the pressure in line 18 to shut off the line 253 from the low pressure return line 26, and by the combined pressures in lines 228, 242 to connect the lines 26, 253. The spool 243 carries a toroidal seal 249 which is engageable with an end of the valve housing to define an area thereon which is 1.125 times the effective area of the end 245.

In normal use the solenoid valve 230 (FIG. 9) is energised, the chamber 223 is in communication with the restrictors 224, 225, and the valve 221 regulates fuel flow to the engine 10. The servo pressure in chamber 223 is less than that in line 18 and is applied through the line 228 to the area within the seal 249 on the valve spool 243 (FIG. 10), and is thus insufficient to overcome the bias applied to the spool end 245 by the high pressure in line 18. The line 253 is thus shut off from the low pressure line 26 and the non-return valve 243 (FIG. 10) remains shut.

In the event of malfunction of the circuit 28, or of all of the electrical supplies, the solenoid valve 230 (FIG. 9) is de-energised, creating a hydraulic lock in the chamber 223 to arrest the element 222. High pressure from the line 18 is applied through the orifice of the valve 230 and the restrictor 225 to the low presssure line 26. The pressure in line 228 rises but, as a result of flow through the restrictor 225, does not reach that in the line 18, and is insufficient to move the spool 243 to connect the line 253 to the low pressure line 26. The engine operator may then manually rotate the control element 255 to an initial position in which the high pressure in line 18 is applied through the bores 240, 241 therein, and through the line 242, to the annular outer area of the spool end 244. The spool 243 then lifts to connect the line 253 to low pressure. The pressure in chamber 223 (FIG. 9) is relieved through the non-return valve 243, and the element 222 moves to its fully open position. Once the spool 243 has lifted the pressure in line 228 is applied to the whole of the larger area of the spool end 244 and maintains connection between the lines 26 and 253, even after a drop in pressure in line 242 as a result of subsequent further rotation of the control element 255. Thereafter the element 255 of valve 254 may be manually rotated by the control 257 to regulate fuel flow.

We claim:

1. A fuel control system for a gas turbine engine, comprising a first metering device responsive to a first servo pressure in a chamber of said device, a first, electrically operable regulating valve for controlling said first servo pressure, a second, metering device responsive to a power demand for the engine, a selector device for selecting fuel flow regulation by said first or said second metering device, an interrupt valve operable in response to absence of an electrical control signal to said regulating valve, for creating a hydraulic lock in said chamber thereby to arrest operation of said first device, and means operable when fuel control by said second metering device has been established, for moving said first metering device to a fully open condition.

2. A system as claimed in claim 1 in which said first and second metering devices are arranged in series.

3. A system as claimed in claim 1 in which said second metering device is in series with said first metering device and is responsive to a second servo° pressure, and which includes a regulating valve or controlling said second servo pressure, said selector device comprising a selector valve which is operable either to set said second servo pressure to a value which urges said second device to a fully open position or to a value controlled by said second regulating valve.

4. A system as claimed in claim 3 in which said regulating valve for said second servo pressure is manually operable.

5. A systen as claimed in claim 3 in which said means for moving said first metering device to a fully open condition comprises a valve, responsive to operation of said selector valve to select fuel regulation by said second metering device, for changing the pressure in the chamber of said first metering device.

6. A system as claimed in claim 3, which includes a third metering device in series with said second metering device and responsive to the collective pitch of rotor blades drivable by said engine, said third metering device being rendered operative by selection of said second metering device to regulate fuel flow.

7. A system as claimed in claim 6 in which said third metering device is responsive to a third servo pressure and which includes a regulating valve for controlling said third servo pressure, said selector device being operable either to set said second and third servo pressures to values which urge said second and third devices to their fully open conditions, or to values in which said regulating valves control said second and third servo pressures respectively.

8. A system as claimed in claim 7 in which the regulating valve for said third servo pressure is manually operable.

* * * * *